United States Patent [19]

Binsack et al.

[11] 4,260,690

[45] Apr. 7, 1981

[54] THERMOPLASTIC POLYESTER MOULDING COMPOSITIONS WITH GOOD TOUGHNESS PROPERTIES

[75] Inventors: Rudolf Binsack, Krefeld; Dieter Rempel, Leverkusen; Helmut Korber, Odenthal; Dieter Neuray, Krefeld, all of Fed. Rep. of Germany

[73] Assignee: Bayer Aktiengesellschaft, Fed. Rep. of Germany

[21] Appl. No.: 113,369

[22] Filed: Jan. 18, 1980

[30] Foreign Application Priority Data

Jan. 23, 1979 [DE] Fed. Rep. of Germany ....... 2902468

[51] Int. Cl.³ .............................................. C08L 51/00
[52] U.S. Cl. .................................... 525/64; 260/40 R; 525/264; 525/309; 525/310; 525/315; 525/316; 525/319; 525/322; 525/324

[58] Field of Search ................ 525/64, 264, 309, 310, 525/315, 316, 319, 322, 324

[56] References Cited

U.S. PATENT DOCUMENTS

4,022,748  5/1977  Schlichting et al. .................. 525/64

FOREIGN PATENT DOCUMENTS

1519355  7/1978  United Kingdom ...................... 525/64

*Primary Examiner*—J. Ziegler
*Attorney, Agent, or Firm*—Connolly and Hutz

[57] ABSTRACT

The toughness of thermoplastic polyesters can essentially be improved by addition of a new type of graft polymers which contain one grafting site for about 400 to 2000 carbon atoms, the average molecular weight $M_w$ of the graft branches being from 2000 to 40,000.

9 Claims, No Drawings

THERMOPLASTIC POLYESTER MOULDING COMPOSITIONS WITH GOOD TOUGHNESS PROPERTIES

This invention relates to moulding compositions consisting of homogenous mixtures of thermoplastic polyesters, particularly polyalkylene terephthalates, and grafted polyolefins.

In the context of the invention, "homogeneous" means that the particles of the graft polymer are uniformly distributed throughout the polymer matrix and have a diameter of less than 40 μm and generally less than 20 μm.

As thermoplastic moulding compositions, thermoplastic polyesters, particularly polyethylene terephthalate and polybutylene terephthalate, are distinguished by a number of valuable technological properties, such as for example rigidity, hardness, abrasion resistance, dynamic strength and thermal stability. Another advantage which has made thermoplastic polyesters an important constructional material is the fact that they can be rapidly processed to form complicated and large mouldings. This applies in particular to polybutylene terephthalate.

However, thermoplastic polyesters have a certain lack of toughness. This applies in particular to two-dimensional toughness which is a critical property for housing components.

Numerous proposals have been put forward with a view to increasing the toughness of thermoplastic polyesters by the addition or incorporation by condensation of other polymers, particularly those based on modified elastomers and polyolefins (German Offenlegungsschrift Nos. 1,694,173 and 1,928,369; German Ausleges-chrift Nos. 1,961,226 and 1,962,855; German Offenlegungsschrift Nos. 2,035,390; 2,248,242; 2,310,034; 2,348,377; 2,357,406 and 2,364,318; U.S. Pat. Nos. 3,236,914 and 3,723,574). However, the proposed measures have the disadvantage that the improvement in toughness is accompanied by a deterioration in other properties, for example those mentioned above.

Where hitherto graft polymers have been used for modified thermoplastic polyesters, the products in question have been produced in the usual way and contain one grafting site for every 20,000 to 30,000 carbon atoms, the average molecular weight $M_w$ of the graft branches, determined as the weight average, generally lying between 100,000 and 1,000,000.

It has now surprisingly been found that an improvement in toughness may be obtained without significant disadvantages by adding to the thermoplastic polyesters a new type of graft polymer which contains one grafting site for about 400 to 2000 carbon atoms, the average molecular weight $M_w$ of the graft branches being from 2000 to 40,000.

In this very rational new process, the graft base is not used in the form of a solution or latex, as has previously been the case. Neither is there any need for prolonged swelling of the graft base by graft monomer, as described in German Offenlegungsschrift No. 2,454,770. Instead, the polyolefin graft base is reacted, in a first stage in molten form with oxygen with intensive mixing, preferably in an extruder, resulting in the formation of peroxide groups. In a second stage, preferably carried out during the same passage through the extruder, the radically polymerizable vinyl compounds are grafted onto the polyolefin graft base, the initiator radicals required for this purpose being supplied by the peroxide groups formed in the first stage.

Accordingly, the present invention provides mixtures of
1. 60 to 99% by weight and preferably 75 to 97% by weight of thermoplastic polyester, and 2. 1 to 40% by weight and preferably from 3 to 25% by weight of polyolefin graft polymer obtainable from (a) 70 to 99% by weight and preferably 75 to 97% by weight of a graft base consisting of a homopolymer of aliphatic and/or aromatic mono-olefins or of a copolymer of these olefins, up to 50% by weight of other monoolefinically unsaturated, radically polymerisable compounds and/or up to 5% by weight of diolefins, and (b) 1 to 30% by weight and preferably 3 to 25% by weight of radically graftable ethylenically unsaturated compounds, the percentages quoted under (1) and (2) being based on the sum of components (1) and (2), the percentages quoted in the first line of (a) and (b) being based on the sum of components (a) and (b) and the remaining percentages quoted under (a) being based on the sum of the starting monomers used for the production of the graft base, characterised in that a melt of the graft base (a) is brought into contact with oxygen or oxygen-containing gases for at most 10 minutes with intensive mixing under a pressure of from 1 to 150 bars and at a temperature of from 80° to 300° C., the ethylenically unsaturated compounds (b) to be grafted on are added immediately afterwards with intensive mixing in the absence of oxygen or oxygen-containing gas and the residual monomers are removed after the graft polymerisation reaction.

In the context of the invention, the expression "mixtures" as used in connection with "mixtures of thermoplastic polyester and polyolefin graft polymer" includes a generally partial grafting reaction which may be identified by preparative fractionation with dissociating solvents and subsequent analysis of the fractions.

Polyolefins suitable as the graft base (a) are any aliphatic and aromatic polyolefins such as, for example, polyethylene, polypropylene, polybutene, polystyrene and their copolymers, such as for example copolymers of ethylene and propylene or styrene and acrylonitrile. In addition, the polyolefins may contain up to 5% by weight of residues of diolefins and up to 50% by weight of residues of radically copolymerisable vinyl compounds, particularly those based on vinyl esters, preferably vinyl acetate, or unsaturated carboxylic acids and/or their derivatives.

Preferred unsaturated carboxylic acids or acid derivatives are acrylic acid and methacrylic acid or their esters and amides, particularly the methyl, ethyl, n- and iso-propyl, n-, iso-, sec.- and tert.-butyl, 2-ethyl hexyl and cyclohexyl esters of these acids.

Preferred graft monomers (b) are, for example, acrylic acid, methacrylic acid, the methyl, ethyl, n- and iso-propyl, n- iso-, sec.- and tert.-butyl, 2-ethyl hexyl and cyclohexyl esters of these acids, (meth) acrylamide, vinyl acetate, styrene, maleic acid anhydride and acrylonitrile.

The quantity of active oxygen (peroxide groups) introduced in the first stage of the grafting process may be from about 1000 to 10,000 ppm. There is no significant reduction in the molecular weight of the graft base during formation of the peroxide. The activated sites are uniformly distributed throughout the macromolecules of the graft base so that, in contrast to conventional graft polymerisation processes, a very large number of active sites in available. Numerous relatively short side chains are formed therefrom in the following graft polymerisation reaction.

Particularly preferred graft monomers (b) are n-butyl acrylate, iso-butyl acrylate, tert.-butyl acrylate, acrylonitrile and styrene.

The analysis of the polyolefin graft polymers (2) is explained by way of example in the following with reference to a polyethylene grafted with butyl acrylate and acrylic acid:

The polyethylene graft polymer is dissolved at a relatively high temperature in a mixture of the solvents which become immiscible at room temperature, dimethyl formamide and methyl cyclohexane, and fractionated from homogeneous solution at 25° C.; cf. R. Kuhn, Makromolekulare Chemie 177, 1525, (1976). Butyl acrylate/acrylic acid copolymer which has not been grafted on is found in the lower phase rich in dimethyl formamide, whilst ungrafted polyethylene and polyethylene grafted with butyl acrylate and acrylic acid is found in the upper phase.

The grafting yield $$\frac{c_G - c}{c_G}$$

may be determined from the quantity of the non-grafted butyl acrylate/acrylic acid copolymer C and all the grafted and non-grafted butyl acrylate/acrylic acid copolymer fractions $c_G$. In general, the grafting yields amounts to between 50 and 90%.

Gel chromatograms (solvent: tetrahydrofuran) are prepared from the non-grafted butyl acrylate/acrylic acid copolymer, the intrinsic viscosities are determined in tetrahydrofuran and the molecular weights $M_w$ are determined therefrom using a universal standard relation; cf. Hoffmann, H. Kromer, R. Kuhn, Polymeranalytik I, Georg Thieme Verlag, Stuttgart 1977. The molecular weights of the copolymer C correspond to the molecular weights of the graft branches.

The polyalkylene terephthalates used with particular preference as the thermoplastic polyesters (1) generally contain at least 90 mole percent, based on the dicarboxylic acid component, of terephthalic acid residues and at least 90 mole percent, based on the diol component, of residue of a diol corresponding to the following formula:

$$HO(CH_2)_nOH$$

in which n is an integer of from 2 to 10.

In addition to terephthalic acid residues, the polyalkylene terephthalates (1) may contain up to 10 mole percent of residues of other aromatic, aliphatic or cycloaliphatic dicarboxylic acids, for example succinic acid, adipic acid or isophthalic acid residues. In addition to residues of a diol corresponding to the above formula, they may contain up to 10 mole percent of residues of another diol which may also fall within the scope of the above formula. However, up to 10 mole percent of, for example, alkyl-substituted diols, such as neopentyl glycol, 2,2,4-trimethyl-1,6-hexane diol, 2-ethyl-1,3-propane diol, 2,2,4-trimethyl-1,3-pentane diol, 2-methyl-2,4-pentane diol, 3-methyl-2,4-pentane diol or 2-ethyl-1,3-hexane diol, may also be incorporated.

The polyalkylene terephthalates may also be branched by compounds having a branching effect, such as polycarboxylic acids or polyols.

Preferred polyalkylene terephthalates are polyethylene terephthalates and, in particular, polybutylene terephthalate.

The polyalkylene terephthalates used as component (1) generally have an intrinsic viscosity of from 0.6 to 1.5 dl/g, as measured in phenol/o-dichlorobenzene (1:1 parts by weight).

The mixtures according to the invention may be prepared in the usual mixing units, such as kneaders, single-screw and multi-screw extruders. Twin-screw extruders are particularly suitable. Components (1) and (2) are highly compatible with one another.

Mouldings produced from the moulding compositions according to the invention show a surface of high quality, very good toughness and excellent dimensional stability under heat and, more particularly, very good two-dimensional toughness and very high resistance to ageing in hot air.

The above-mentioned advantage of the moulding compositions according to the invention are probably attributable to the fact that at least part of the polyolefin graft polymers used is grafted onto the polyester.

The moulding compositions according to the invention may, of course, also contain conventional fillers and reinforcing materials, processing aids, nucleating agents, dyes and stabilisers. They may also be flame-proofed.

Suitable fillers and reinforcing materials are, for example, glass fibres, mica, talcum, calcium metasilicate and quartz used in quantities of up to 50% by weight, based on the sum of components (1) and (2). Preferred stabilisers are, for example, the organic esters of phosphoric and phosphorous acid and also sterically hindered phenols.

Suitable flameproofing agents are those compounds normally used for polyesters, for example aromatic halogen compounds, such as decabromodiphenyl ether, decabromodiphenyl, tetrabromophthalic acid anhydride and the imides of tetrabromophthalic acid and also polycarbonates containing co-condensed tetrabromobisphenol-A residues. In addition, synergistically active compounds, such as for example antimony trioxide, polytetrafluoroethylene and colloidal silica, may be present. The quantity in which the flameproofing agent is used has to be adapted to the particular application envisaged. In general, a quantity of less than 20% by weight, based on the sum of components (1) and (2), is entirely adequate.

The invention is illustrated by the following Examples.

EXAMPLES

Production of the polyolefin graft polymers I–IV.

The graft products I and II based on Baylon ® 19 N 430 (high-pressure polyethylene manufactured by Bayer AG) which are mentioned in Table 1 were produced in a unidirectionally rotating twin-screw extruder with self-cleaning screws 57 mm in diameter and 41 D in length. The melt was compressed by a left-hand thread, sudden increases in pitch and kneading blocks staggered to the left in the double-flighted variable screw trim. 400 liters per hour of air under a pressure of 100 to 130 bars were introduced into the induction zone and 1200 liters per hour of air under a pressure of 70 to 90 bars were introduced into the oxidation zone.

The graft monomers were introduced into the polymerisation zone under a pressure of from 15 to 18 bars.

The grafting of styrene and acrylonitrile or n-butyl acrylate onto Buna® AP 407 (an ethylene-propylene rubber manufactured by Buna-Werke Huls) was carried out in a contrarotating twin-screw extruder of the Point Eight type manufactured by Welding Inc. (screw diameter 20 mm, length 48 D) under the conditions specified in Table 1 (graft products III and IV). The melt was compressed by increasing the core diameter of the screws in the compression zone. The screws had a constant pitch of 1 D.

80 liters per hour of air under a pressure of 40 to 60 bars were introduced into the induction zone and 240 liters per hour of air under a pressure of from 20 to 40 bars were introduced into the oxidation zone. The graft monomers were introduced into the polymerisation zone under a pressure of 5 bars. The unreacted monomers were then evaporated and the graft product was extruded in the form of a strand and granulated. The test results are set out in Table 1.

TABLE 1a

| Production of the polyolefin graft polymers | | | | | |
|---|---|---|---|---|---|
| Graft Product | | I | II | III | IV |
| Throughput | [kg/h] | 75 | 80 | 0.9 | 1.05 |
| Screw speed | [rpm] | 100 | 107 | 110 | 100 |
| Average residence time | [mins.] | 2.3 | 2.1 | 6 | 6 |
| Peroxide content after oxidation | [ppm] | 1000 | 1200 | 1200 | 1200 |
| Mooney value* after oxidation | | — | — | 45 | 44 |
| MFL+ at 190° C. after Ox. | [g/10 mins.] | 7.3 | 7.8 | — | — |
| Monomer input | [kg/h] | 11.3 | 4.5 | 0.12 | 0.195 |
| Monomer composition | | 20% AS 80% n-BA | 100% t-BA | 72% S 28% AN | 100% n-BA |
| Conversion | [%] | 80 | 89 | 99 | 87 |
| Product composition | | 1.1% AS 11% n-BA | 5% t-BA | 11% S 4% AN | 16% n-BA |
| Residual peroxide content | [ppm] | 300 | 250 | 600 | 540 |
| Mooney value* graft product | | — | — | 47 | 20 |
| MFI+ at 190° C. graft product | [g/10 mins.] | 2.4 | 5.0 | — | — |

Explanation of the abbreviations
AN acrylonitrile
AS acrylic acid
n-BA n-butyl acrylate
t-BA tert.-butyl acrylate
S styrene
The precentages represent % by weight
+Melt Flow Index according to DIN 53 735, as measured at 190° C. under a load of 216 Kp: measuring nozzle: 2.095 mmφ, length: 8 mm.
*L 4 (100° C.)

TABLE 1b

| Screw conditions in the production of the polyolefin graft polymers | | | | | |
|---|---|---|---|---|---|
| Graft Product | I | | II | III | IV |
| Feed zone | 2 D | 86° C. | 85° C. | 2 D 110° C. | 110° C. |
| Melting zone | 4 D | 140° C. | 140° C. | 5 D 190° C. | 190° C. |
| Compression zone | 1 D | 200° C. | 205° C. | 2 D 200° C. | 200° C. |
| Induction zone | 3 D | 220° C. | 225° C. | 3 D 235° C. | 235° C. |
| Oxidation zone | 6 D | 210° C. | 210° C. | 6 D 210° C. | 210° C. |
| Compression zone | 1 D | 200° C. | 200° C. | 2 D 210° C. | 210° C. |
| Venting zone | 2 D | 190° C. | 190° C. | 4 D 190° C. | 190° C. |
| Compression zone | 1 D | 200° C. | 200° C. | 2 D 200° C. | 190° C. |
| Polymerisation zone | 1 D | 210° C. | 210° C. | 8 D 210° C. | 190° C. |
| Compression zone | 1 D | 210° C. | 210° C. | 2 D 210° C. | 190° C. |
| Evaporation zone | 6 D | 220° C. | 7 D | 200° C. | 190° C. |
| Extrusion zone | 3 D | 100° C. | 200° C. | 5 D 200° C. | 190° C. |
| | 41 D | | | 48 D | |

The temperatures are expressed in degrees Centigrade.

EXAMPLES 1 TO 5

The polyolefin graft polymers were incorporated into polybutylene terephthalate having an intrinsic viscosity of 0.95 dl/g in a twin-screw self-cleaning extruder (screw diameter 32 mm) at temperatures of from 250° to 270° C.

The production, composition and properties of the mixtures are shown in Table 2.

The intrinsic viscosity in dl/g was measured in phenol/o-dichlorobenzene (1:1 by weight) and theoretically based on the polyester used.

TABLE 2

Production, composition and properties of the mixtures of polybutylene terephthalate and olefin graft polymer

| Example No. | Graft type | polymer % by weight | Melt temperature °C. | Intrinsic viscosity dl/g | Impact[1] strength kj/m² | Notched[1] impact strength kj/m² | Ball[2] indentation hardness MPa | Dimensional[3] stability under heat according to Vicat °C. | Impact strength[1] after 300 h/160 in air kj/m² |
|---|---|---|---|---|---|---|---|---|---|
| 1 | II  | 5  | 258 | 0.93 | ub.[4] | 3.0 | 114 | 173 | 70 |
| 2 | II  | 20 | 268 | 0.92 | ub.    | 3.5 | 83  | 132 | 55 |
| 3 | I   | 5  | 260 | 0.94 | ub.    | 3.0 | 115 | 174 | 60 |
| 4 | III | 5  | 263 | 0.92 | ub.    | 4.5 | 115 | 174 | 58 |
| 5 | IV  | 5  | 264 | 0.93 | ub.    | 4.5 | 114 | 173 | 59 |

[1] DIN 53 453
[2] DIN 53 456
[3] DIN 53 460
[4] ub. = unbroken

We claim:
1. A mixture of
   (1) 60 to 99% by weight of a thermoplastic polyester and
   (2) 1 to 40% by weight of a polyolefin graft polymer obtainable from
   (a) 70 to 99% by weight of a graft base consisting of a polymer of at least one member selected from the group consisting of aliphatic and aromatic mono-olefins, said polymer containing up to 50% by weight of polymerized other mono-olefinically unsaturated radically polymerizable compounds, or said polymer containing up to 5% by weight of polymerized diolefins and
   (b) 1 to 30% by weight of a radically graftable ethylenically unsaturated compound, the percentages for (1) and (2) being based on the sum of (1) and (2), the percentages of (a) and (b) being based on the sum of components (a) and (b) and the remaining percentages set forth under (a) being based on the sum of the starting monomers used for the production of the graft base, such polyolefin graft polymer having been produced by contacting a melt of graft base (a) with oxygen or oxygen-containing gas for at most 10 minutes with intensive mixing under a pressure of from 1 to 150 bars and at a temperature of from 80° to 300° C., adding the ethylenically unsaturated compound to be grafted immediately after said contact with oxygen or oxygen-containing gas with intensive mixing in the absence of oxygen or oxygen-containing gas and removing residual monomers after graft polymerization reaction.

2. A mixture as claimed in claim 1, characterized in that the thermoplastic polyester is a polyalkylene terephthalate having an intrinsic viscosity of from 0.6 to 1.5 dl/g.

3. A mixture as claimed in claim 2, characterized in that the polyalkylene terephthalate is polyethylene terephthalate or polybutylene terephthalate.

4. A mixture as claimed in claim 1, characterized in that the graft base (a) is polyethylene, polypropylene, polybutene or polystyrene.

5. A mixture as claimed in claim 1, characterized in that the graft base (a) is a copolymer of at least two monomers from the group consisting of ethylene, propylene, butene, styrene and acrylonitrile.

6. A mixture as claimed in claim 1, characterized in that the graft base (a) contains up to 5% by weight of residues of diolefins.

7. A mixture as claimed in claim 1, characterized in that the graft base (a) contains up to 50% by weight of residues of radically polymerizable ethylenically unsaturated compounds.

8. A mixture as claimed in claim 1, characterized in that the graft monomers (b) are selected from the group consisting of acrylic acid, methacrylic acid, the methyl, ethyl, propyl, butyl, 2-ethylhexyl and cyclohexyl esters of these acids, acrylamide, methacrylamide, vinyl acetate, styrene, maleic acid anhydride and acrylonitrile.

9. A mixture as claimed in claim 1, characterized in that it contains 75 to 97% by weight of (1), 3 to 25% by weight of (2), 75 to 97% by weight of (a) and 3 to 25% by weight of (b).

* * * * *